US009254968B2

(12) United States Patent
Garner et al.

(10) Patent No.: US 9,254,968 B2
(45) Date of Patent: Feb. 9, 2016

(54) INVERTING VACUUM CONVEYOR SYSTEM

(71) Applicant: Alliance Industrial Corporation, Lynchburg, VA (US)

(72) Inventors: Gary R. Garner, Lynchburg, VA (US); Quentin L. Wilson, Big Island, VA (US); Thomas E. Jackson, Gladys, VA (US)

(73) Assignee: ALLIANCE INDUSTRIAL CORPORATION, Lynchburg, VA (US)

( * ) Notice: Subject to any disclaimer, the term of this patent is extended or adjusted under 35 U.S.C. 154(b) by 0 days.

(21) Appl. No.: 14/561,947

(22) Filed: Dec. 5, 2014

(65) Prior Publication Data

US 2015/0158674 A1    Jun. 11, 2015

Related U.S. Application Data

(60) Provisional application No. 61/912,644, filed on Dec. 6, 2013.

(51) Int. Cl.
*B65G 47/248* (2006.01)
*B65G 21/20* (2006.01)
*B65G 47/94* (2006.01)

(52) U.S. Cl.
CPC .......... *B65G 47/248* (2013.01); *B65G 21/2036* (2013.01); *B65G 47/945* (2013.01); *B65G 2201/0252* (2013.01)

(58) Field of Classification Search
CPC ...... B65G 17/323; B65G 17/46; B65G 17/48; B65G 21/2027; B65G 21/2036; B65G 47/248; B65G 2201/0244; B65G 2201/0252; B65G 2207/24; B65G 2207/44; B65G 47/945
See application file for complete search history.

(56) References Cited

U.S. PATENT DOCUMENTS

| | | | |
|---|---|---|---|
| 2,649,214 A | 8/1953 | Kirby et al. | |
| 3,838,766 A | 10/1974 | Wagers, Jr. et al. | |
| 4,136,767 A * | 1/1979 | Sarovich | B65G 21/2036 198/404 |
| 4,146,467 A | 3/1979 | Sauer et al. | |
| 6,012,216 A | 1/2000 | Esteves et al. | |
| 6,213,281 B1 * | 4/2001 | Biondi | B65G 15/58 198/407 |
| 8,733,536 B2 | 5/2014 | Jones | |
| 2012/0211030 A1 * | 8/2012 | Jones | B08B 9/28 134/22.1 |

FOREIGN PATENT DOCUMENTS

| | | |
|---|---|---|
| EP | 0132150 B1 | 10/1987 |
| JP | 2006347739 A | 12/2006 |
| NL | 2004492 C | 10/2011 |

* cited by examiner

*Primary Examiner* — Leslie A Nicholson, III
*Assistant Examiner* — Keith R Campbell
(74) *Attorney, Agent, or Firm* — Quarles & Brady LLP

(57) ABSTRACT

A conveyor system includes an elongated vacuum plenum having an interior defined between upwardly and downwardly facing surfaces between opposing ends. A slot defining a portion of a conveyor path is formed in the plenum and extends from one end of the plenum at the upwardly facing surface toward the other end and the downwardly facing surface. A plurality of conveyor modules forming part of an endless loop are received in the slot and move along the conveyor path. At least some of the modules have at least one opening in fluid communication with the interior of the plenum. An object disposed on at least one of the modules is held against the at least one module by a vacuum in the interior of the plenum as the at least one module moves along the conveyor path from the upwardly facing surface toward the downwardly facing surface.

16 Claims, 8 Drawing Sheets

INVERTING VACUUM CONVEYOR SYSTEM

CROSS REFERENCES TO RELATED APPLICATIONS

This application claims priority to U.S. Provisional Patent Application No. 61/912,644 filed on Dec. 6, 2013, which is fully incorporated herein by reference.

STATEMENT REGARDING FEDERALLY SPONSORED RESEARCH

Not Applicable.

BACKGROUND OF THE INVENTION

The present invention relates to modular chain conveying systems, and more particularly to conveying systems that invert objects being conveyed.

Conveying systems that invert objects, such as cans or bottles for cleaning, typically include twisted guides that invert the object moving long a conveyor path. The guides keep the objects on the conveyor path and twist to invert the object. One advantage of this system is that it is an inline system that does not take up a lot of floor space or add to the conveyor path length. However, if the shape or size of the object being conveyed changes, the guides must be adjusted to accommodate the new shape or size. This is very time consuming and impractical for many applications.

Vacuum conveying systems do not require guides to invert objects, and thus can easily accommodate objects having different shapes and sizes. In one known prior art system, a conveyor chain wraps around a drum circumference. A vacuum in the drum retains objects on the conveyor chain as the chain travels around the drum circumference. Another known prior art conveying system includes a rotating cylindrical plenum having a vacuum. A conveyor chain wraps around the rotating cylindrical plenum which retains objects on the chain via the vacuum. Both of these known systems take a significant amount of floor space and increases the length of chain required to conveyor the objects. A need exists for an inverting conveyor system that does not wrap entirely around a drum and does not require reconfiguring when art object size changes.

SUMMARY OF THE INVENTION

A general objective of the present invention is to provide a conveying system that inverts objects of different shapes and/or sizes without requiring modification or significantly increasing the conveyor path length. This objective is accomplished by a conveyor system including an elongated vacuum plenum having an interior defined between an upwardly facing surface and a downwardly lacing surface between a first end and a second end. A slot defining a portion of a conveyor path is formed in the plenum and extends from the first end of the plenum at the upwardly facing surface toward the second end and the downwardly facing surface. A plurality of conveyor modules forming part of an endless loop are received in the slot and move along the conveyor path. At least some of the modules have at least one opening in fluid communication with the interior of the plenum. An object disposed on at least one of the modules is held against the at least one module by a vacuum in the interior of the plenum as the at least one module moves along the conveyor path from the upwardly facing surface toward the downwardly facing surface.

This and still other objectives and advantages of the present invention will be apparent from the description which follows. In the detailed description below, preferred embodiments of the invention will be described in reference to the accompanying drawing. These embodiments do not represent the full scope of the invention. Rather the invention may be employed in other embodiments. Reference should therefore be made to the claims herein for interpreting the breadth of the invention.

DETAILED DESCRIPTION OF PREFERRED EMBODIMENTS

Figure 1:
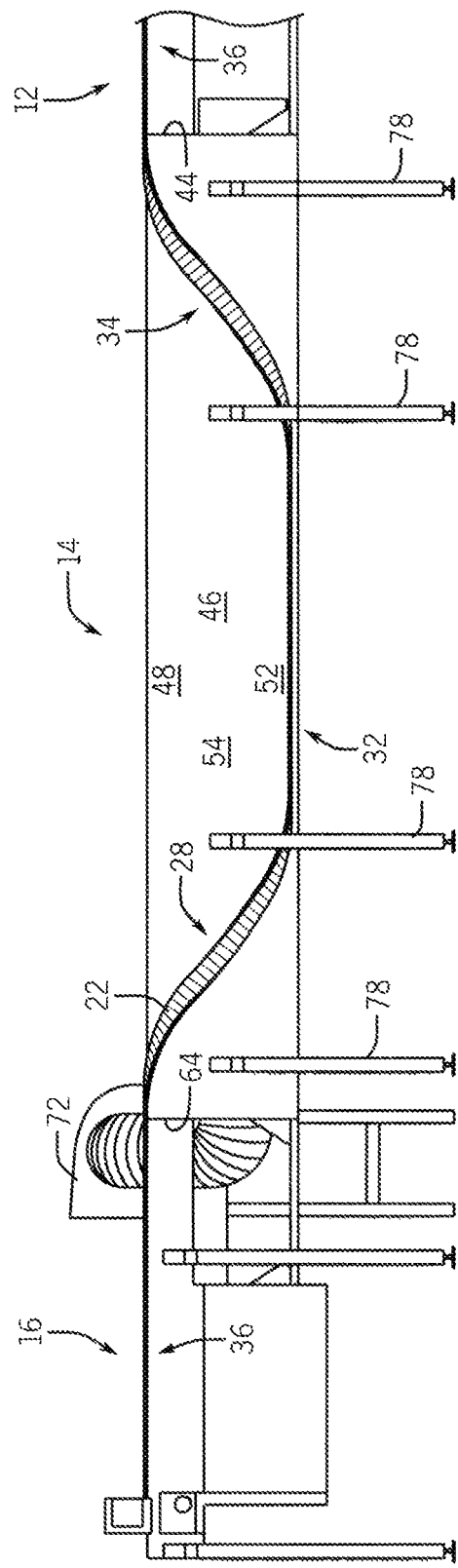
FIG. 1 is a side view of an inverting vacuum conveying assembly incorporating the present invention.

An inverting vacuum conveying assembly 10, shown in FIG. 1, forming part of a conveying system includes a feed conveyor 12 that conveys objects, such as cans having a substantially flat closed bottom and an open top, onto an inverter 14. In the embodiment disclosed herein, the inverter 14 inverts the can from an upright orientation, such that the open top opens upwardly, to an inverted orientation, such that the open top opens downwardly, for cleaning, emptying, or other purpose. The inverter 14 then returns the can to the upright orientation for conveyance onto a takeaway conveyor 16.

Figure 5:
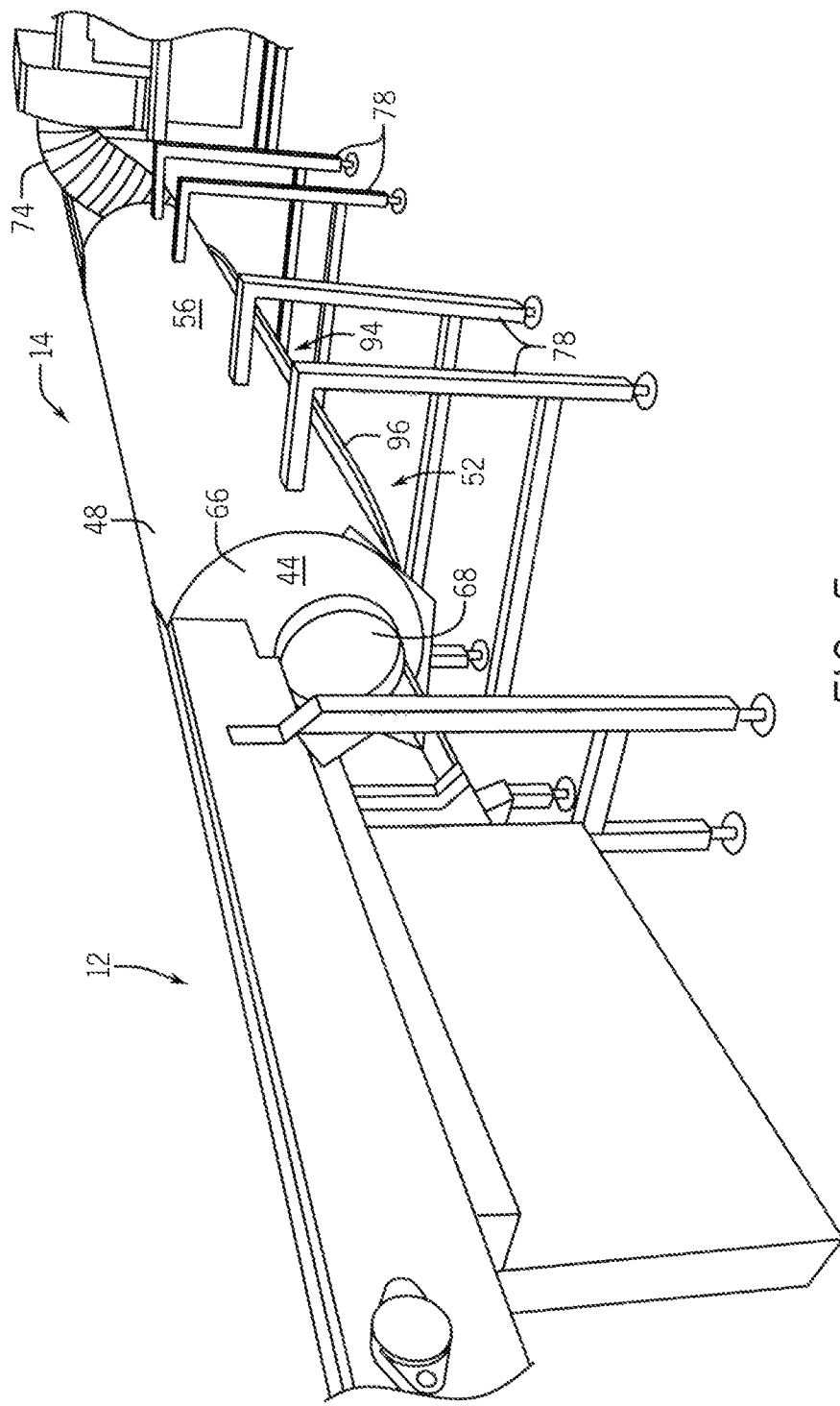
FIG. 5 is a perspective in-feed side end view of the assembly shown FIG. 1.
Figure 6:
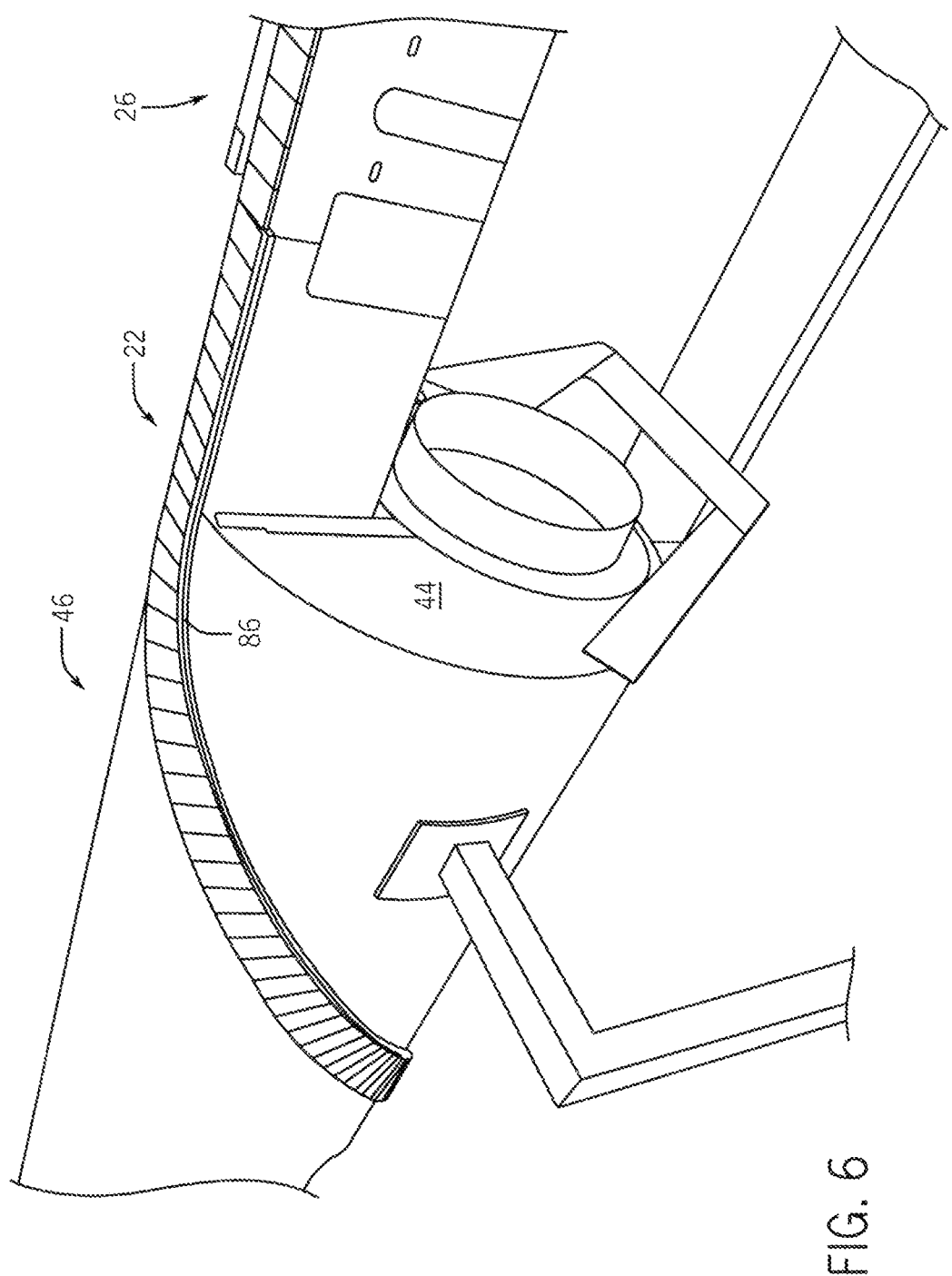
FIG. 6 is a detailed perspective in-feed side end view of the assembly shown FIG. 1.

The feed conveyor 12 can be any conventional straight or curved conveyor capable of transferring, objects to the inverter 14. As shown in FIGS. 5 and 6, the feed conveyor 12 is preferably a non-vacuum straight-running modular chain conveyor having a plurality of pivotally linked chain modules driven along a straight conveyor path. Of course, the feed conveyor 12 can be a belt conveyor, conveyor table, and the like, capable of transferring objects to the inverter 14.

The inverter 14 conveys the objects along a conveyor path, that inverts the objects and then returns the objects to an upright position before transferring the object to the takeaway conveyor 16. As shown in FIGS. 1-6, the inverter 14 includes a conveyor chain 22 formed from chain modules 24. Each chain module 24 is pivotally linked to adjacent chain modules 24 forming an endless loop. The chain 22 receives objects on a straight in-feed section 26 of the inverter 14 and conveys the objects along a transition section 28, such as a 180° spiral path, to invert the objects. In the preferred embodiment, the inverted objects remain inverted along a straight, conveyor path section 32 before travelling along another transition section 34, such as another a 180° spiral path, returning the objects to an upright position. The chain 22 then conveys the objects along a straight discharge section 36 where the objects are transferred to the takeaway conveyor 16.

The in-feed and discharge sections 26, 36 of the inverter 14 in the embodiment disclosed herein define straight conveyor paths. Preferably, both sections 26, 36 are straight vacuum conveyors that securely hold the objects on the chain 22. A drive 42 at a distal end of the discharge section 36 urges the chain 22 along the entire conveyor path though the inverter 14. Of course, the in-feed and discharge sections 26, 36 can be curved sections, and the chain 22 can be driven by one or more drives without departing from the scope of the invention. Moreover, the feed and discharge conveyors 12, 16 can be slave driven by the in-feed and discharge sections 26, 36 or be driven by separate, independent drives without departing from the scope of the invention.

Figure 2:
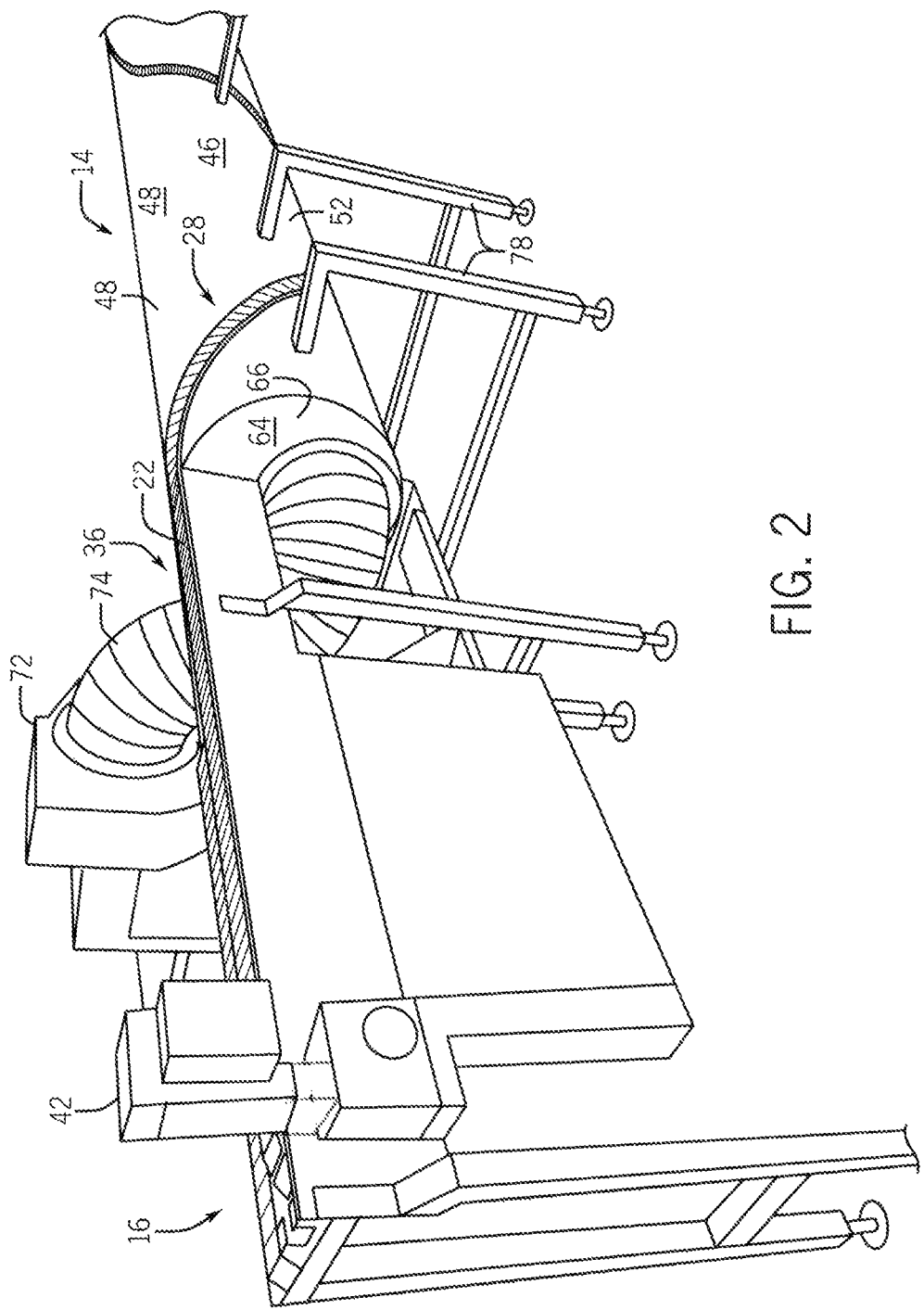
FIG. 2 is a perspective discharge side end view of the assembly shown in FIG. 1.

As shown in FIG. 6, the in-feed section 26 abuts an in-feed end 44 of a cylindrical metal plenum 46 having an interior. Likewise, as shown in FIG. 2, the discharge section 36 abuts a discharge end 64 of the plenum 46. The interior of the cylindrical plenum 46 is defined by an upwardly lacing surface 48 and a downwardly facing surface 52 joined by two opposing side surfaces 54, 56 and extending between the in-feed end 44 and discharge end 64. Although a cylindrical plenum is shown, the plenum can be any shape that can accommodate the conveyor path described herein without departing from the scope of the invention.

Figure 7:
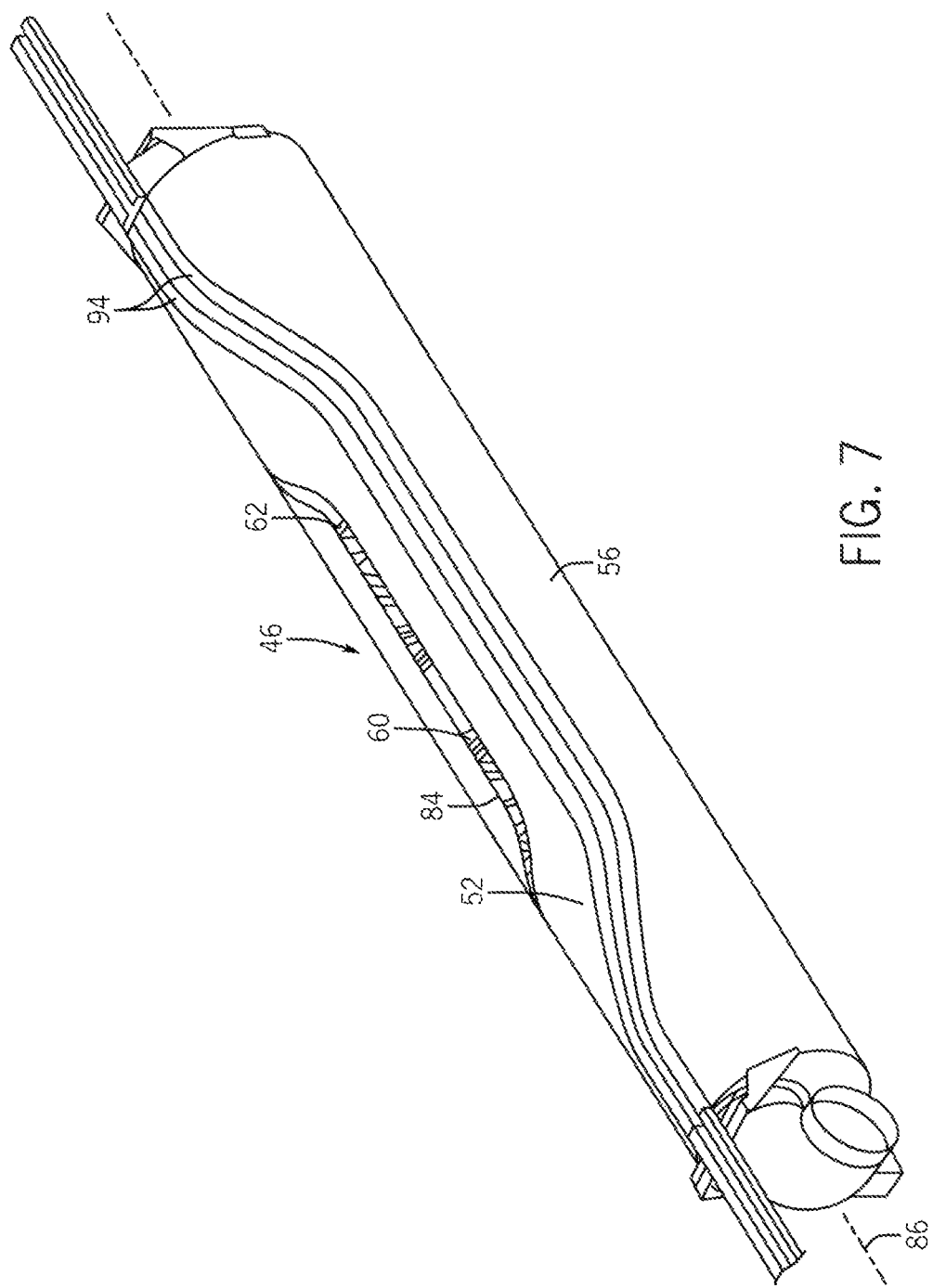
FIG. 7 is a perspective bottom view of the plenum of the assembly shown FIG. 1.

In the preferred embodiment shown in FIG. 7, the plenum 46 is made in three sections, each consisting of a cylindrical outer shell formed by two lengths of sheet metal rolled longitudinally to each form half of the shell, and bolted together using hubs 60 consisting of two round metal spoke-plates with a metal edge-wrap plate rolled to fit the outer diameter of the spoke-plates, and to which the spoke-plates are welded, separated by the width of the wrap plate. The hubs 60 each contain a square-shaped area open to the outside diameter of the hub 60 which is aligned with a track of the conveyor chain 22 to allow clearance for the part of the chain 22 running inside the shell through a slot 84 that is cut along the plenum.

The shell has a configuration of holes through which it is bolted to the hubs 60, another configuration of holes through which internal and external structural pieces for floor/hanger supports are bolted together, and a third configuration of holes to which nuts are welded for bolting the external return track to the shell. The hubs 60 also have a configuration of holes with nuts welded into them to hold the bolts connecting the shell to the hubs 60. Splice hubs 62 with edge-wrap plates wide enough to encompass a double row of holes with weld nuts around its circumference are used to bolt the center section of the drum to the two outer sections. Outer spoke-plate hubs at either end of the drum also contain a configuration of holes with weld nuts to bolt on an end cap 66, the straight in-feed and discharge sections 26, 36 of vacuum conveyor, and the vacuum manifold 74.

Each end 44, 64 of the plenum 46 is closed by an end cap 66 defining ends of the plenum interior. The end caps 66 have a configuration of holes that align with holes with weld nuts corresponding in the outer spoke plates. Bolts received in the holes threadably engage the weld nuts to fix each end cap to the plenum shell. An opening formed proximal the upwardly facing surface 48 of the plenum 46 receives one of the in-feed and discharge conveyors sections 26, 36. Another configuration of holes formed in each end cap 66 align with holes in flanges of the in-feed and discharge conveyors sections 26, 36 for bolting the in-feed and discharge conveyors sections 26, 36 to the respective end cap 66. A large round hole 68 formed in each end 44, 64 permits air flow needed to draw a vacuum in the plenum.

The vacuum is created by a blower 72 in fluid communication with the interior of the plenum 46 through the large round hole 68 in at least one of the end caps 66. Preferably, a manifold 74 extends from the large round hole 68 and is connected to the blower 72. The blower 72 draws air out of the plenum 46 through the manifold 74 to draw a vacuum in the plenum 46. If only one blower 72 is used, one of the large round holes 68 can be blocked or omitted altogether without departing from the scope of the invention. Moreover, the blower 72 can be in fluid communication with the plenum interior through one or more openings formed in the plenum 46, such as through openings formed through the plenum shell without departing from the scope of the invention. Preferably, the in-feed and discharge conveyor sections 26, 36 of the inverter 14 are vacuum conveyors, and in fluid communication with the plenum 46 through, the end caps 66 to draw a vacuum in the vacuum conveyor sections 26, 36.

The plenum 46 is supported above the ground by supports 78. Preferably, the supports 78 are square metal tubing with flanges containing a configuration of holes with weld nuts welded to the ends, and bolted across the inside of the shell parallel to the floor, through the shell, and through holes in corresponding flanges welded to square tubing attached to a welded square tubing frame external to the drum. Of course, the plenum 46 can be supported using any method known in the art, such as by hanging the plenum 46 from above using supports attached to a ceiling or other structure without departing from the scope of the invention.

Figure 8:
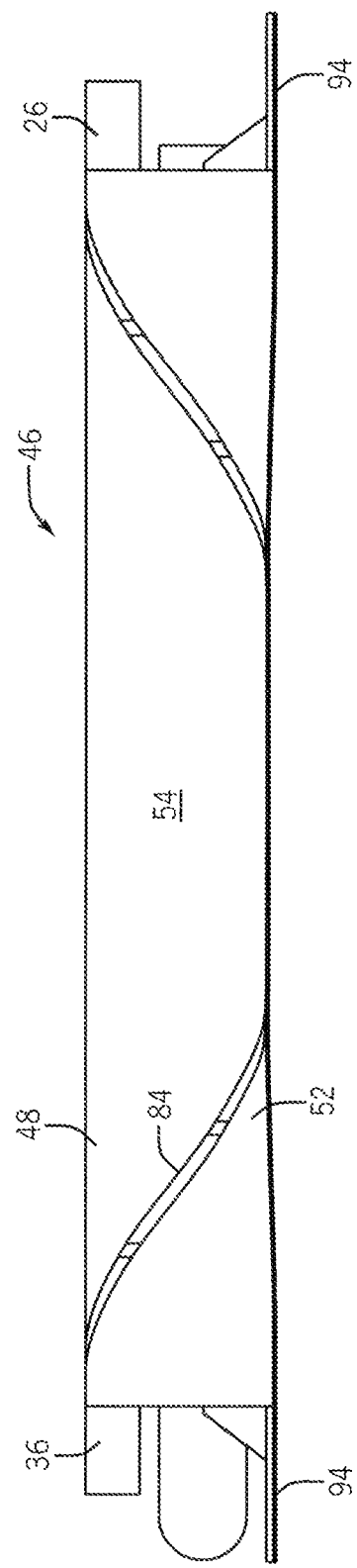
FIG. 8 is a side view of the plenum shown in FIG. 7.

As shown in FIGS. 7 and 8, the preferred conveyor path through the inverter 14 is defined in part by a slot 84 formed in the plenum 46. The slot 84 is cut along the plenum 46 starting straight substantially parallel to a longitudinal axis 86 of the plenum 46 along the upwardly facing surface 48 of the plenum at the in-feed end 44 where the straight vacuum conveyor in-feed section 26 connects. The slot 84 then spirals down 180 degrees over one of the side surfaces 54 to the downwardly facing surface 52 of the plenum 46 along a first spiral segment. Preferably, the slot 84 runs straight substantially parallel to the longitudinal, axis 86 along the downwardly facing surface 52 of the plenum 46 for a predetermined length to provide sufficient time at a predetermined conveyor speed to clean or empty inverted objects secured to the chain 22 by the vacuum. The slot 84 then spirals along a second spiral segment hack up along the same side surface 54 of the plenum 46 to the upwardly lacing surface 48 at the plenum discharge end 64 and runs straight substantially parallel to the longitudinal axis 86 along the upwardly facing surface 48 to the straight vacuum conveyor discharge section 36 abutting the discharge end 64 of the plenum 46. Preferably, each edge of the slot 84 is lined with long lengths of flexible, low-friction plastic 84 (shown in FIG. 6) in rectangular cross-section that is slotted to fit snugly over the edges of the slot 84, thereby forming a carry track for the chain 22.

Figure 3:
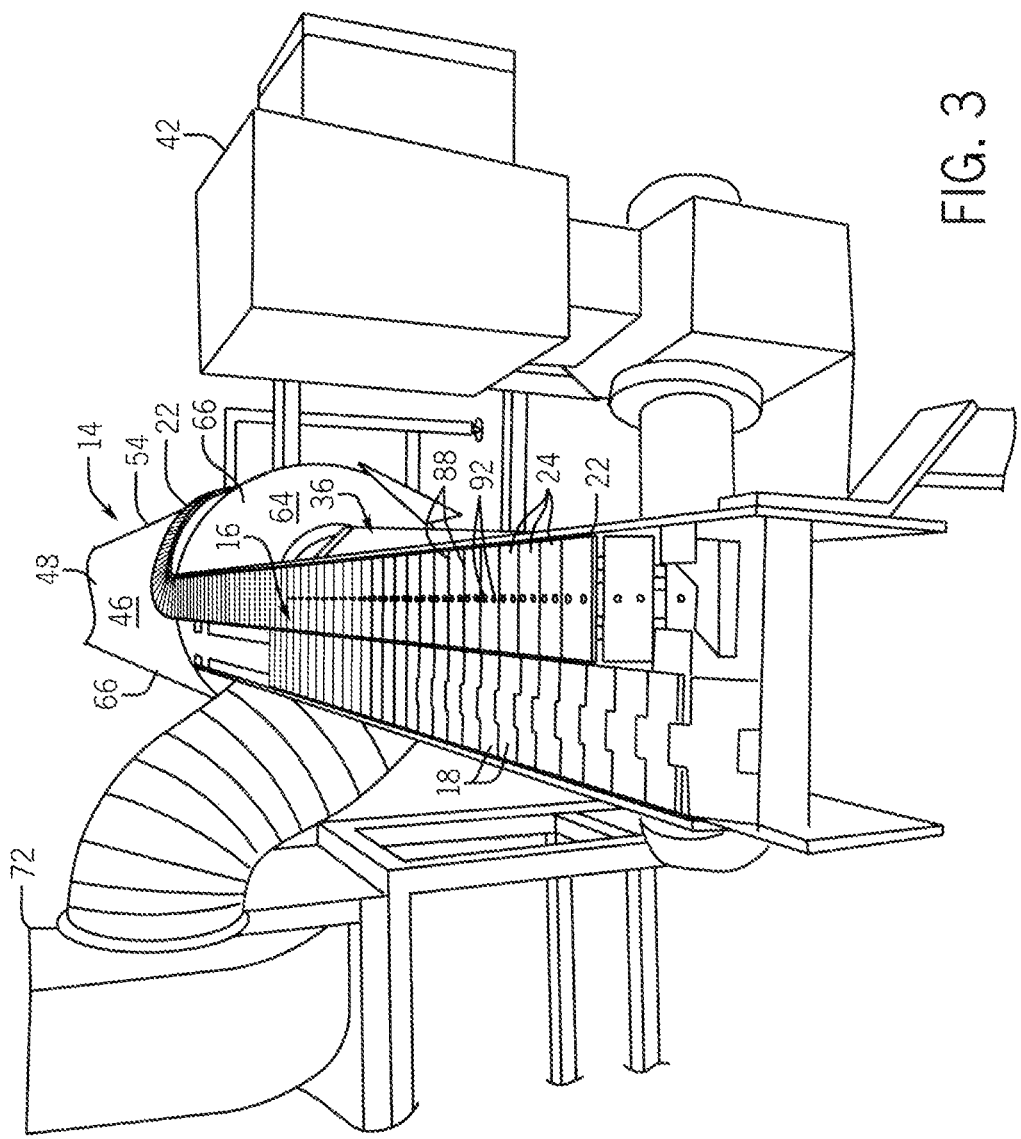
FIG. 3 is a perspective discharge end view of the assembly shown FIG. 1.
Figure 4:
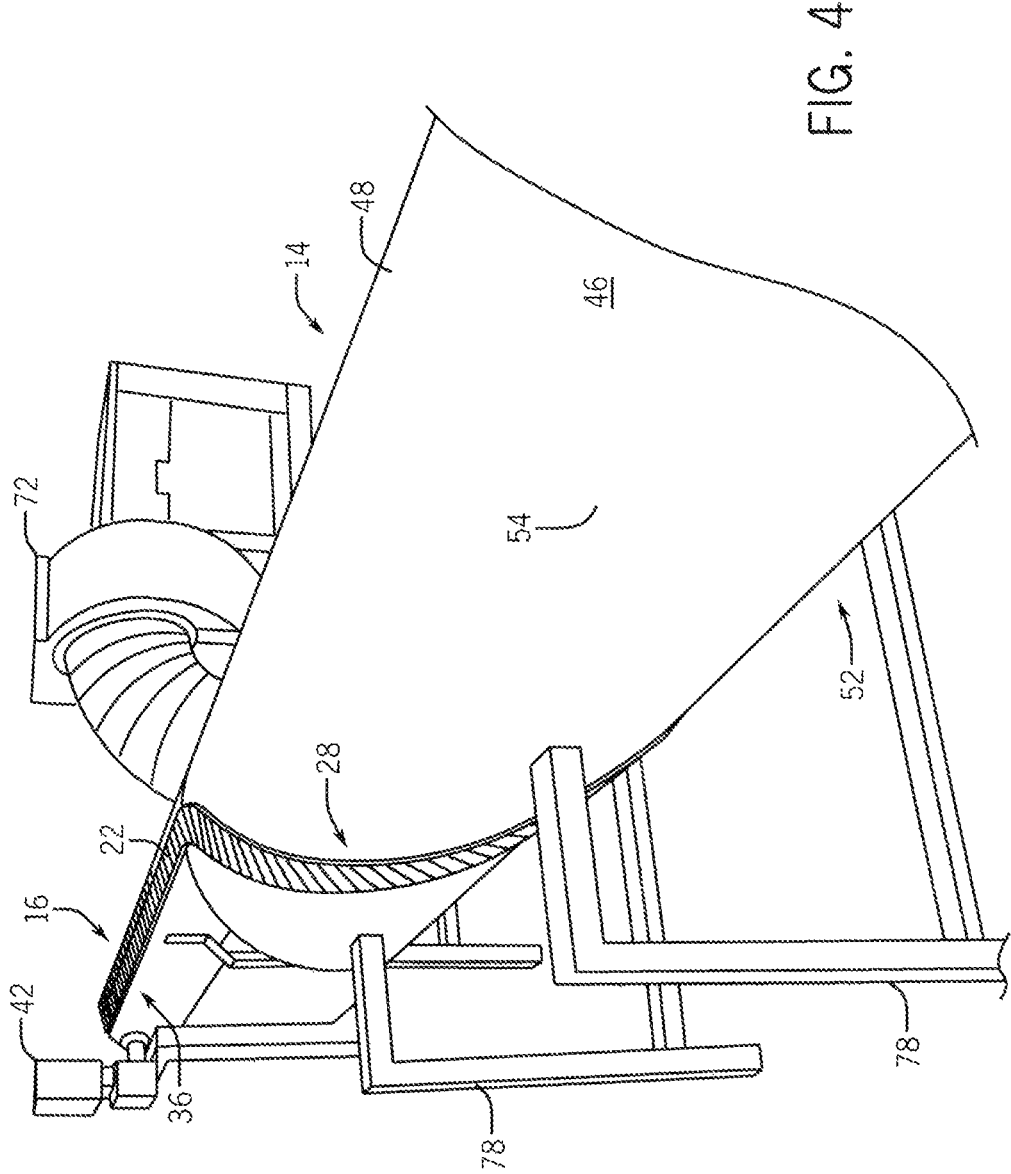
FIG. 4 is a perspective side view looking toward the discharge end of the assembly shown FIG. 1.

As shown in FIG. 3, the chain 22 is formed from plastic side-flexing conveyor chain modules 24 having a conveying surface 88. Objects are retained on the conveying surface 88 of one or more of the modules 24 by the vacuum created in the plenum 46. Two holes 92 drilled through the conveying surface 88 of each module 24 is in fluid communication with the plenum interior allowing the vacuum to be pulled through the conveying surface 88 and retain an object on the module 24. Although two holes 92 formed through the conveying surface 88 of each module 24 is preferred, one or more holes can be provided through the conveying surface 8 of all or some of the modules 24 without departing from the scope of the invention. In a preferred embodiment, the chain 22 is a steel roller chain-based tabbed flight side-flexing conveyor chain. However, any vacuum chain or belt capable of traversing the conveyor path described herein can be used without departing from the scope of the invention.

In one embodiment, objects, such as open-topped cans are retained on at least one chain module 24 via the vacuum on the in-feed section 26 at the in-feed end 44 of the plenum 46. The objects remain attached to the chain module 24 as the chain module 24 moves along the conveyor path defined by the slot 84 formed in the plenum 46. Advantageously, the objects are inverted for cleaning when the chain module 24 having the object retained thereon by the vacuum moves along the downwardly facing surface 52 of the plenum 46. The objects retained on the module 24 are returned to the upright position as the chain module 24 moves toward the upwardly facing surface 48 of the plenum 46 at the discharge end 64 of the plenum 46 and onto the straight discharge section 36 prior to being discharged onto the takeaway conveyor 16.

The conveyor chain 22 is returned from the discharge section 36 to the in-feed section 26 via a return track 94. The return track 94 includes a low-friction plastic track 96 bolted to the outside of the plenum 46. Preferably, the return track 96 starts along the downwardly lacing surface 52 of the plenum 46 to a point where the slot 84 approaches the downwardly lacing surface 52 of the plenum, then spirals slightly up along the side surface 56 opposite to the side surface 54 along which the slot 84 spirals down so the return track 96 does interfere with the slot 84, runs parallel to the slot 84 while the slot 84 runs straight along the downwardly facing surface 52 of the plenum 46, then spirals back down to the downwardly facing surface 52 of the plenum 46 as the slot 84 spirals back up to the upwardly facing surface 48 of the plenum 46.

Preferably, the external return track 94 consists of two long lengths of flat metal plate that are rolled in the necessary spiral pattern as previously described, and bolted at appropriate spacing opposing each other over tubular metal spacers to the previously described configuration of holes with weld nuts in the shell. Long lengths of flexible, low-friction plastic as described for the carry track above are fitted over the edges of the flat plate to form the return way for the conveyor chain 22.

In another embodiment of the present invention, the center section of the plenum can be replaced with a straight vacuum conveyor connecting the two plenum end sections. In the another embodiments end caps capping off both ends of the end sections and defining two separate plenum interiors in fluid communication with each other through the straight vacuum conveyor would could be provided.

The discharge conveyor 16 can be any conventional straight or curved conveyor capable of receiving objects to the inverter 14. As shown in FIGS. 2 and 3, the discharge conveyor 12 is preferably a non-vacuum straight-running modular chain conveyor having a plurality of pivotally linked chain modules 18 driven along a straight conveyor path. Of course, the discharge conveyor 12 can be a belt conveyor, conveyor table, and the like, capable of transferring objects to the inverter 14.

While there has been shown and described what are at present considered the preferred embodiments of the invention, it will be obvious to those skilled in the art that various changes and modifications can be made therein without departing from the scope of the invention defined by the appended claims.

We claim:

1. A conveyor system comprising:
   an elongated vacuum plenum having an interior defined between an upwardly facing surface and a downwardly facing surface between a first end and a second end, said plenum having at least one semi-circular side surface joining said upwardly facing surface and said downwardly facing surface and defining a longitudinal axis extending through said first and said second end substantially parallel to said at least one semi-circular side surface;
   a slot formed in said plenum and extending from said first end of said plenum at said upwardly facing surface toward said second end substantially parallel to said longitudinal axis, toward said downwardly facing surface along said at least one semi-circular side surface on a curvilinear path, and toward said upwardly facing surface along said at least one semi-circular side surface on a curvilinear path, and then to said second end at said upwardly facing surface, said slot defining a portion of a conveyor path; and
   a plurality of conveyor modules received in said slot and forming part of an endless loop moving along said conveyor path, at least some of said modules having at least one opening in fluid communication with said interior, wherein an object disposed on at least one of said modules is held against said at least one module by a vacuum in said interior as said at least one module moves along said conveyor path from said upwardly facing surface toward said downwardly facing surface.

2. The conveyor system as in claim 1, in which said plenum includes said at least one semi-circular side surface and an opposing side surface, each of said first side surface and said second side surface joining said upwardly facing surface and said downwardly facing surface, said at least one semi-circular side surface and said opposing side surface further defining said interior therebetween.

3. The conveyor system, as in claim 2, in which said surfaces define a cylinder between said first and second end.

4. The conveyor system as in claim 1, in which said conveyor path transitions between said upwardly facing surface and said downwardly facing surface along a spiral segment.

5. The conveyor system as in claim 1, in which said slot extends along said downwardly facing surface towards said second end, and then towards said upwardly facing surface at said second end.

6. The conveyor system as in claim 5, in which said plenum includes said at least one semi-circular side surface and an opposing side surface, each of said at least one semi-circular side surface and said opposing side surface joining said upwardly facing surface and said downwardly facing surface further defining said interior between said first end and said second end, and said slot extends toward said downwardly facing surface through said at least one semi-circular side surface and then returns to said upwardly facing surface prior to reaching said second end through said at least one semi-circular side surface.

7. The conveyor system as in claim 1 including a conveyor track fixed to an exterior of said plenum proximal said downwardly facing surface at said first end and extending toward said second end, said conveyor track forming part of said conveyor path.

8. The conveyor system as in claim 7, in which said conveyor track extends toward said upwardly facing surface.

9. The conveyor system as in claim 1, in which each of said plurality of conveyor modules are pivotally linked to adjacent conveyor modules of the plurality of conveyor modules.

10. The conveyor system as in claim 1, in which said slot defines a conveyor path, at least a portion of which spirals at least 180° between said first end and said second end.

11. A method of inverting an object disposed on at least one module forming part of an endless loop of a plurality of conveyor modules, said method comprising:

moving said at least one module along a conveyor path defined by a slot formed in a vacuum plenum and extending from a first end of said plenum at an upwardly facing surface toward a second end of said plenum substantially parallel to a longitudinal axis defined by said plenum and extending between said first end and said second end substantially parallel to a semi-circular side surface joining said upwardly facing surface and said downwardly facing surface, said slot extending towards said downwardly facing surface along the semi-circular side surface of said plenum joining said upwardly facing surface and said downwardly facing surface, along said downwardly facing surface, and towards said upwardly facing surface along said semicircular side surface of said plenum; and retaining the object on the at least module, as the at least one module moves from the upwardly facing surface toward the downwardly facing surface, by a vacuum in the plenum in fluid communication with an opening formed in the at least one module, wherein said vacuum acts on the object to hold the object against the at least one module.

12. The method as in claim 11, in which said conveyor path transitions between said upwardly facing surface and said downwardly facing surface along a spiral segment.

13. The method as in claim 11, in which the slot extends toward the second end in the downwardly facing surface and then returns to the upwardly facing surface prior to reaching the second end, and the method includes retaining the object on the at least module, as the at least one module moves towards the second end along the downwardly facing surface and then returns to the upwardly facing surface prior to reaching the second end.

14. The method as in claim 13, in which said plenum includes a said at least one semi-circular side surface and an opposing side surface, each of said at least one semi-circular side surface and said opposing side surface joining said upwardly facing surface and said downwardly facing surface further defining said interior between said first end and said second end, and said slot extends toward said downwardly facing surface through said at least one semi-circular side surface and then returns to the upwardly facing surface prior to reaching the second end through said at least one semi-circular side surface.

15. The method as in claim 11, in which said at least one module returns past said plenum along a conveyor path defined by a conveyor track fixed to an exterior of said plenum.

16. The method as in claim 11, in which said upwardly facing surface and downwardly facing surface are surfaces of a cylindrical plenum.

* * * * *

UNITED STATES PATENT AND TRADEMARK OFFICE
CERTIFICATE OF CORRECTION

| | | |
|---|---|---|
| PATENT NO. | : 9,254,968 B2 | Page 1 of 1 |
| APPLICATION NO. | : 14/561947 | |
| DATED | : February 9, 2016 | |
| INVENTOR(S) | : Gary R. Garner et al. | |

It is certified that error appears in the above-identified patent and that said Letters Patent is hereby corrected as shown below:

In the Specification

Column 1, line 44: "art" should be --an--

Column 1, line 55: "lacing" should be --facing--

Column 3, line 18: "lacing" should be --facing--

Column 4, line 43: "hack" should be --back--

Column 4, line 44: "lacing" should be --facing--

Column 5, line 21: "lacing" should be --facing--

Column 5, line 23: "lacing" should be --facing--

Signed and Sealed this
Thirty-first Day of May, 2016

Michelle K. Lee
*Director of the United States Patent and Trademark Office*